United States Patent Office 3,776,965
Patented Dec. 4, 1973

3,776,965
SELECTIVE CONVERSION OF DIETHYLCYCLOHEXANES TO GEM-STRUCTURED TETRAMETHYLCYCLOHEXANES
Henri Robert Debus, Meise, Marcel Van Tongelen, Diegem, and Raymond M. Cahen, St. Pierre, Belgium, and Calvin Lee Daniels, Big Spring, Tex., assignors to Labofina S.A., Brussels, Belgium, and Cosden Oil & Chemical Company, Big Spring, Tex.
No Drawing. Filed May 10, 1972, Ser. No. 251,883
Int. Cl. C07c 5/28
U.S. Cl. 260—666 R          13 Claims

ABSTRACT OF THE DISCLOSURE

Gem-polymethylcyclohexanes are produced by a process of contacting certain alkylcyclohexanes under anhydrous conditions with a Friedel-Crafts catalyst and an effective amount of a promoter for the catalyst selected from hydrogen halide, alkyl halides, olefins and mixtures thereof at temperatures in the range of 0 to 70° C. The contact time is generally from 0.1 to about 10 hours.

---

This invention relates to isomerization. In another aspect, this invention relates to the formation of gem structured polymethylcyclohexanes from alkyl and polyalkylcyclohexanes.

Polymethylbenzenes are conventionally used for the production of aromatic polycarboxylic acids, for example, phthalic acids from xylenes, pyromellitic acid or anhydride from durene, trimesic acid from trimethylbenzene, and the like. The commercial importance of these aromatic polycarboxylic acids has been steadily growing the last few years, since they are useful raw materials for the manufacture of synthetic resins.

Recently, a process has been developed for converting gem-polymethylcyclohexanes into useful polymethylbenzenes such as durene. This recently developed process utilizes a catalyst which is preferably a metal of the platinum group to dehydrogenate and reform the gem-structured polymethylcyclohexanes into the desired polymethylbenzenes such as durene. However, the prior art provides no effective process which can be used to commercially produce readily available alkylcycloparaffin hydrocarbons into gem-structured polymethylcyclohexanes useful as precursors in the above-described recently developed process without impairment by secondary reactions, such as cracking reactions.

One object of this invention is to provide a novel process for converting alkylcyclohexanes into gem-structured polymethylcyclohexanes having the same number of carbon atoms with a minimum of secondary reactions.

Another object of this invention is to provide a novel process for the production of precursors for polymethylbenzenes such as durene in a substantially pure form.

According to the invention, gem-structured polymethylcyclohexanes are produced from feed material of alkylcyclohexanes having the general structural formula:

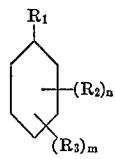

Wherein $R_1$ is an aliphatic radical having from 2 to 6 carbon atoms, $R_2$ is an aliphatic radical having from 1 to 3 carbon atoms, $R_3$ is a methyl radical, $n$ is an integer from 0 to 3 and $n$ is 0 or 1 and wherein the total number of carbon atoms in said alkylcyclohexane is between 8 and 12 inclusive, by a process comprising contacting said feed material under anhydrous conditions with a Friedel-Crafts catalyst or a mixture of Friedel-Crafts catalysts and an effective amount of a promoter for said catalyst selected from hydrogen halide, alkyl halides, olefins and mixtures thereof at a temperature in the range of from 0 to about 150° C. for a time sufficient to form a reaction product containing said gem structured polymethylcyclohexanes having the same number of carbon atoms as the feed material.

According to one embodiment of this invention, the above-described reaction is carried out under batch conditions in the presence of the Friedel-Crafts catalyst or mixture of Friedel-Crafts catalysts and a combination of promoters including hydrogen halide, and an alkyl halide and/or olefin.

According to still a further embodiment of this invention, the above described reaction is carried out under continuous process conditions in the presence of said Friedel-Crafts catalyst or mixture of Friedel-Crafts catalysts and a single promoter, hydrogen halide.

According to the preferred embodiment of the subject invention, gem structured tetramethylcyclohexanes are produced according to the above-described process from a feed of diethylcyclohexane with a promoted $AlCl_3$ catalyst.

DESCRIPTION OF THE PREFERRED EMBODIMENTS OF THE INVENTION

The prefix "gem" is used in the scope of this invention as the abbreviation of the word "geminate," meaning compounds having two groups attached to the same carbon atom of the nucleus. Thus, an example of the preferred gem-structured tetramethylcyclohexane made in accordance with this invention is as follows:

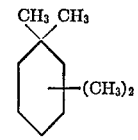

Many alkylcyclohexane feed materials may be used in the scope of this invention. However, alkylcyclohexanes containing at least 10 carbon atoms are particularly advantageous, not only because the corresponding polymethylbenzenes have acquired a great commercial importance, but also because the gem-structured corresponding polymethylcyclohexanes are obtained with unexpected high yield by the process of this invention. Examples of alkylcyclohexanes which are more particularly used as feed materials include diethylcyclohexane, dipropylcyclohexane, methylpropylcyclohexane, methyl-ethylpropylcyclohexane, trimethylpropylcyclohexane, butyl- and hexycyclohexanes.

To obtain rapid, single-pass conversion, it is desirable from a practical standpoint that the feed material be substantially free of aromatics.

By "substantially free" of aromatics, it is meant that the feed material should contains no more than about 5% by weight aromatic, more often less than 2% by weight aromatics and preferably less than 1000 parts per million of aromatics.

The reaction is carried out in accordance with this invention under substantially anhydrous conditions in the presence of a Friedel-Crafts catalyst or a mixture of Friedel-Crafts catalysts. Any suitable Friedel-Crafts catalyst known in the art can be utilized in the scope of this invention. The preferred group of such catalysts include $AlCl_3$, $BF_3$, $SnCl_4$, $SbCl_3$, $ZnCl_2$, $TiCl_4$, $GaCl_3$, $AlBr_3$, $FeCl_3$, $GaBr_3$ and the like. The most useful catalysts are $AlCl_3$ and mixtures of $AlCl_3$ and $SbCl_3$. The catalyst is generally utilized in amounts from about one to about 60 weight percent of the feed material in the reaction zone and preferably, from about 2 to about 40 weight percent of the feed material in the reaction zone during batch reaction, and from about 10 to 40 weight percent of the feed material in the reaction zone during continuous reaction. As will be discussed more fully hereinbelow, frequent addition of small amounts of the catalyst during continuous isomerization is advantageous in order to maintain a high product yield.

In addition to the above-described Friedel-Crafts catalyst, it is desirable in accordance with this invention to include a promoter in the reaction zone which is selected from anhydrous hydrogen halide, preferably hydrogen chloride, alkyl halides, olefins and mixtures thereof. Suitable alkyl halides include the alkyl monohalides having from one to 14 carbon atoms, preferably 2 to 8 carbon atoms, while suitable olefins include mono acyclic and mono alicyclic olefins having from 2 to 14 carbon atoms, preferably 5 to 12 carbon atoms. Examples of suitable such materials are tert-butyl chloride, tert-butyl bromide, 2,2,4 - trimethylpentene, 3,3,5 - trimethylcyclohexene, isopropylcyclohexene, sec-butyl-chloride, 2,2,4 - triethylpentenes, 3,3,5-triethylcyclohexene, and the like. When carrying out the reaction under batch conditions, particularly when employing fresh catalyst, it has been found that the presence of both hydrogen halide and an alkyl halide, olefin or mixture thereof are desirable in order to obtain rapid conversion of the alkylcyclohexanes to the gem-structured polymethylcyclohexanes. In addition, isomerization activity lost by the presence of excessive amounts of aromatics may be restored by means of such promoters. However, when carrying out the process of this invention with the active catalyst complex obtained under continuous process conditions, it has been found that the presence of only the hydrogen halide is necessary for satisfactory results.

The hydrogen halide is preferably added to the alkyl cyclohexane feed before the contact with the Friedel-Crafts catalyst. Generally, the amount of hydrogen halide utilized to promote the reaction of this invention is sufficient to saturate the feed under the conditions employed, preferably the amount of hydrogen chloride employed is from about 0.00001 to about 5 weight percent of hydrogen halide. The promoter such as the alkyl halide or the olefin preferably is added to the catalyst in the reactor in amounts of less than about 5 weight percent based upon the feed in the reactor, and more preferably in the range of from 0.01 to one percent of the feed in the reactor.

Another promoting effect can be obtained by use of a mixture of two or more Friedel-Crafts catalysts, e.g. $AlCl_3$ and $SbCl_3$. Using such mixtures, high isomerization activities are also observed even in the absence of the above discussed olefin, alkyl halide and hydrogen halide promoters.

The isomerization reaction is carried out at a temperature lower than 150° C. Preferably, the reaction is carried out at a temperature between about 0 and 70° C. in order to avoid secondary reactions, for example, the cracking and disproportionation reactions. A more preferred reaction temperature range is between 10 and 50° C., for example, about 30° C. is utilized to assure prolonged catalyst activity and high conversion to gem-polymethyl cyclohexanes.

Pressure in the reaction zone can be atmospheric or superatmospheric, the choice depending to a large degree on economic and practical considerations.

In the preferred mode of operation with the most useful feed stocks, the feed is passed serially through two backmix reactors containing, for example, approximately equal quantities of the Friedel-Crafts catalyst. It has been found that in such circumstances, very high conversions to gem-structured polymethylcyclohexanes are obtained. The use of such two reactors permits use of a feed containing a higher percentage of aromatics than are normally desirable in the feed.

The contact time of the alkylcyclohexanes in the reactor depends upon such factors as temperature, type of the catalyst, and the like. However, it is generally preferred to have a contact time between the alkylcyclohexane feed and the catalyst of between about 0.1 and 10 hours. Typical space velocities in continuous operation are from about 0.1 to about 10 parts by weight of feed per part by weight of catalyst per hour. As an illustration of the variance of contact time in accordance with the continuous process of the subject invention, a 6 hour contact time can be utilized with 15 weight percent catalyst (based upon feed in the reactor) and a reaction temperature of 30° C., as well as with a 30 weight percent catalyst (based upon feed in the reactor) and a reaction temperature of 20° C. Another example includes a 2 hour contact time with 30 weight percent catalyst (based upon the feed in the reactor) and a reaction temperature of 30° C.

In batch operations, the preferred mode is to initially admix the desired amount of HCl in the feed material. Then the desired amounts of Friedel-Crafts catalyst and alkyl halide or olefin promoter are added to HCl containing feed material. If a Friedel-Crafts catalyst mixture such as $AlCl_3$ and $SbCl_3$ are employed, other promoters may be omitted. The reactor can be any conventional reactor such as a stirred batch reactor system. After a reaction time of between 0.1 to about 10 hours, the effluent from the batch reactor contains from about 20 to 50 percent of the gem-structured polymethylcyclohexane product. This material can then be passed to a distillation zone and fractionated. The gem-structured polymethylcyclohexane products of the subject invention have lower boiling points than corresponding non-geminated methylcyclohexanes and consequently, they can easily be separated by distillation. Also, the preferred gem-structured tetramethylcyclohexanes have atmospheric boiling points between about 148 and 162° C. and are easily separated from the reactor effluent by a conventional multi-tray distillation column. The bottoms from such separation preferably are recycled.

In operation of the continuous liquid phase reaction in accordance with this invention, the continuous reaction can be initiated with a second Friedel-Crafts catalyst or with the alkyl halide or olefin promoter in combination with the hydrogen halide as hereinabove discussed. However, once stable catalyst activity is obtained, the presence of the second Friedel-Crafts catalyst or the alkyl halide and/or olefin promoter is unnecessary, but the presence of the hydrogen halide is still desirable. Alternately, the continuous reaction can be slowly initiated without the second Friedel-Crafts catalyst, alkyl halide or olefin promoter being present in the reaction zone. Generally, the catalyst activity is a function of its concentraiton in relation to the feed, as well as the temperature. After about 50 parts by weight of feed per part by weight of $AlCl_3$ is achieved, the catalyst will liquefy. Fresh catalyst is then added in an amount depending on the operating conditions. Such amount will usually be from about 0.1 to 5.0 wt. percent, preferably 0.2 to 2 wt. percent, with respect to the amount of hydrocarbons introduced into the reactor. An equivalent amount of catalyst complex is withdrawn in order to maintain a constant catalyst concentration.

According to a preferred mode of operation of this invention, diethylcyclohexane is reacted in a continuous process in the presence of about 10 to 40 weight percent $AlCl_3$ based on feed in the reactor and at a catalyst temperature of between about 20 and 30° C. The diethylcyclohexane is initially saturated with HCl (dry) and maintained saturated with HCl during a contact time, generally of about 1 to 4 hours. High yields of gem structured tetramethylcyclohexanes are obtained from this process.

In another embodiment of the present invention, diethylcyclohexane is reacted in a batch operation in the presence of 5 to 30 weight percent fresh $AlCl_3$ based on feed in the reactor and at a catalyst temperature of between about 20 and 30° C. The diethylcyclohexane is maintained throughout a reaction period of 3 to 6 hours saturated with hydrogen chloride. An alkyl halide of 3 to 6 carbon atoms such as sec.- or tert.-butyl-chloride is present as a second promoter in an amount of 0.01 to 1.0% by weight, based on feed.

The following examples are given to better facilitate the understanding of this invention and are not intended to limit the scope thereof.

EXAMPLE 1

Three batch reaction runs were carried out, each using the total feed of 100 parts by weight of diethylcyclohexane together with ten parts by weight of AlCl$_3$ (10 weight percent of the feed) and a reaction temperature of 30° C. All of the runs were carried out under anhydrous conditions. The feed was a dry mixture of diethylcyclohexanes containing less than 10 parts per million aromatics. In the first run, the feed was saturated at 0° C. with dry HCl and then passed into the batch reaction chamber and reacted for 6 hours. In the second run, the feed was passed into the dry reaction chamber containing the AlCl$_3$ and 0.1 weight percent (of the feed) of tert.-butylchloride. In the third run, the feed was saturated at 0° C. with dry HCl and then passed into the reactor containing the AlCl$_3$ and 0.1 weight percent (of the feed) of tert.-butyl chloride. The results are set forth in Table I below:

TABLE I

| | Wt. percent conversion to gem-tetramethylcyclohexane product | | |
|---|---|---|---|
| | (1) | (2) | (3) |
| Reaction time, (hours) | HCl promoter | Tert-butyl-chloride promoter | HCl and tert-butyl-chloride promoter |
| 2 | 1 | 2 | 7 |
| 4 | 2 | 3 | 13 |
| 6 | 3 | 4 | 26 |

As can be seen from Table I above, the presence of both the HCl and an alkyl halide are desirable batch reaction to obtain rapid conversion to the tetramethylcyclohexane product. Comparable results have been obtained with the diethylcyclohexane being replaced as feed with 1-methyl-4-isopropylcyclohexane.

EXAMPLE 2

Next, 5 runs were carried out in the batch reactor utilized in Example 1, each utilizing a different promoter system. In each of the runs, 100 parts by weight of the dry diethylcyclohexane feed containing less than 10 parts per million aromatics was saturated with dry HCl at ambient temperatures (22–28° C.) and passed to the reactor containing 10 parts by weight AlCl$_3$ (10 weight percent based upon feed) together with 0.1 part by weight of an alkyl halide or olefin promoter for the AlCl$_3$ (0.1 weight percent based upon the weight of the feed). In the last run, no promoter was present but instead of 0.1 weight percent of diethylbenzene was placed into the reactor. The results are set forth in Table II below:

TABLE II

| | Wt. percent conversion to gem-tetramethylcyclohexanes | | | | |
|---|---|---|---|---|---|
| | (1) | (2) | (3) | (4) | (5) |
| Reaction time (hours) | 2,2,4-tri-methyl-pentene promoter | Tert-butyl-chloride promoter | Tert-butyl-bromide promoter | 3,3,5-trimethyl-cyclo-hexene promoter | Diethyl-benzene |
| 2 | 10 | 7 | 6 | 3.5 | 1 |
| 4 | 18 | 13 | 14 | 6 | 1 |
| 6 | 24 | 22 | 20 | 9 | 1 |

As can be seen from Table II, the best results were obtained with 2,2,4-trimethylpentene. The effects of tert.-butylchloride and tert.-butylbromide were comparable. The influence of 3,3,5-trimethylcyclohexane is quite substantial as compared to unpromoted AlCl$_3$. The presence of diethylbenzene appears to suppress the isomerization activity under the conditions employed.

EXAMPLE 3

Four batch reaction runs were carried out, each using the total feed of 100 parts by weight of diethylcyclohexane together with ten parts by weight of AlCl$_3$ (10 weight percent of the feed) and a reaction temperature of 30° C. All of the runs were carried out under anhydrous conditions. The feed contained less than 10 parts per million aromatics. In the first run, the feed was saturated at 0° C. with dry HCl and then passed into the batch reaction chamber and maintained there for 6 hours. In the second run, five parts by weight of SbCl$_3$ (5 wt. percent of the feed) was added to the AlCl$_3$ catalyst. All other conditions were identical as in the first run. In a third run, the feed was passed into the dry reaction chamber containing 10 wt. percent (of the feed) AlCl$_3$ and 5 wt. percent (of the feed) SbCl$_3$ and then 0.1 wt. percent (of the feed) of tert-butylchloride was added. In a fourth run, the feed was saturated at 0° C. with dry HCl and then passed into the reactor containing 10 wt. percent AlCl$_3$ and 5 wt. percent SbCl$_3$ and 0.1 wt. percent tert-butylchloride. The results are set forth in Table III below:

TABLE III

| | Wt. percent conversion to gem TMCH | | | |
|---|---|---|---|---|
| | (1) | (2) | (3) | (4) |
| | HCl plus AlCl$_3$ | HCl plus SbCl$_3$ plus AlCl$_3$ | SbCl$_3$ plus tert.butyl-chloride plus AlCl$_3$ | HCl, SbCl$_3$ plus tert.-butylchloride plus AlCl$_3$ |
| Reaction time, hours: | | | | |
| 2 | 1 | 3 | 12 | 14 |
| 4 | 2 | 25 | 16 | 33 |
| 6 | 3 | 36 | 24 | 42 |

As can be seen from Table III, an increase of the isomerization activity is obtained by addition of 5 wt. percent (of the feed) of SbCl$_3$. Both hydrogen chloride saturation and presence of liquid promoter have a favourable effect on the isomerization activity.

EXAMPLE 4

A continuous liquid phase operation was conducted in accordance with this invention. Initially, 100 parts by weight per hour of diethylcyclohexanes containing no more than 10 parts per million of aromatics was fed to a continuous stirred reactor. To the reactor was added 2 parts by weight per hour of dry HCl. The reactor initially contained 10 parts by weight of AlCl$_3$ with respect to the hydrocarbons present in the reaction zone. The temperature was held at 40° C. for 24 hours, and thereafter lowered to 30° C. The contact time of the hydrocarbons with the catalyst was 6 hours. Under these conditions, a practically constant activity was obtained in the neighborhood of 30% tetramethylcyclohexane yield. After 48 hours of operation, 12 parts by weight of AlCl$_3$ was added to the reactor (12 weight percent of the amount of hydrocarbons present in the reactor zone). This resulted in a sharp increase in isomerization activity (an increase up to 43 percent conversion). The AlCl$_3$ liquefied after approximately 99 hours of operation. Thereafter, approximately 1 weight percent (based upon the hydrocarbons fed to the reactor) of catalyst complex was withdrawn from the reactor and a corresponding 1 weight percent of fresh AlCl$_3$ was added to the reactor every 6 hours. This procedure resulted in constant yield of tetramethylcyclohexanes of approximately 38–40% using only HCl as a promoter. Thus, for continuous liquid phase operation, the presence of HCl only as a promoter appears satisfactory.

EXAMPLE 5

A continuous liquid phase operation was conducted in accordance with this invention. The diethylcyclohexanes (100 parts) are passed through two reactors in series containing each 20 wt. percent active catalyst complex with respect to the hydrocarbons present in the reactor. A stream of dry HCl amounting to 2 parts by weight per hour was also passed serially through the two reactors. The temperature in the two reactors was held at 30° C. The contact time in each reactor was 2 hours. The catalyst complex withdrawals and the fresh $AlCl_3$ additions to each reactor amounted to 1.0 wt. percent with respect to the hydrocarbons fed to the reactors. At the outlet of the first reactor, a 33% of gem-tetramethylcyclohexanes was obtained. At the outlet of the second reactor, the percentage of gem-derivations amounted to 44%. The same results were obtained with a feed consisting of a bottom product after removal of the gem-tetramethylcyclohexanes by fractionation.

EXAMPLE 6

A continuous liquid phase isomerization has been carried out using the liquefied active $AlCl_3$ complex. One hundred parts by weight per hour of triethylcyclohexanes containing no more than 40 parts per million of aromatics was fed to a continuous stirred reactor. To the reactor was added 2 parts by weight per hour of dry HCl. The reactor contained 40 parts by weight of $AlCl_3$ as active complex with respect to the hydrocarbons present in the reactor. The temperature was held at 20° C. and the contact time was 6 hours. Gem-hexamethylcyclohexanes have been obtained in the reaction product.

It is to be understood that various modifications of this invention will now be apparent to one skilled in the art upon reading this specification and it is intended to cover such modification as fall within the scope of the appended claims.

We claim:

1. A method for selectively converting diethylcyclohexanes to their corresponding gem-structured tetramethylcyclohexanes, comprising contacting under anhydrous conditions a diethylcyclohexane-containing feed having less than 5% aromatic content with from about 0.0001 to 5% by weight of an anhydrous hydrogen halide and from about 1 to 60% by weight based on said feed of a Friedel-Crafts catalyst system at a temperature of from about 0 to 150° C. for a period of time of from about 0.1 to 10 hours, whereby from about 20 to 50% of the diethylcyclohexanes are selectively converted to the corresponding gem-structured tetramethylcyclohexanes.

2. The method as defined by claim 1, wherein said hydrogen halide is hydrogen chloride and wherein said Friedel-Crafts catalyst system is selected from the group consisting of $AlCl_3$, $BF_3$, $SnCl_4$, $SnCl_3$, $ZnCl_2$, $TiCl_4$, $GaCl_3$, $AlBr_3$, FeCl and $GaBr_3$.

3. The method as defined by claim 1, wherein said temperature is from about 0 to 70° C.

4. The method as defined by claim 1, wherein said temperature is from about 10 to 50° C.

5. The method as defined by claim 1, wherein said selective conversion is conducted in the presence of from about 0.01 to 5% by weight based upon the feed material of a promoter for said Friedel-Crafts catalyst selected from the group consisting of alkyl monohalides having from 1 to 14 carbon atoms and mono acyclic and monoalicyclic olefins having from 2 to 14 carbon atoms.

6. The method as defined by claim 5, wherein said promoter is selected from the group consisting of tertiary-butyl chloride; tertiary-butyl bromide; 2,2,4'-trimethylpentene; 3,3,5-triethylcyclohexene; isopropylcyclohexene; sec-butyl chloride; 2,2,4-triethylpentenes; and 3,3,5-triethylcyclohexene.

7. The method as defined by claim 1, wherein said conversion is carried out under batch conditions and wherein said feed material is saturated with hydrogen chloride and is contacted with from about 5 to 30% by weight based upon said feed of $AlCl_3$ in the presence of from about 0.01 to 1.0% of a promoter selected from the group consisting of alkyl monohalides having from 1 to 14 carbon atoms and mono acyclic and mono alicyclic olefins having from 2 to 14 carbon atoms for a period of time from about 3 to 6 hours and at a temperature of from 0 to 70° C.

8. The method as defined by claim 1, wherein said temperature is between about 20 and 30° C.

9. The method as defined by claim 1, wherein said conversion is carried out as a continuous process and wherein said feed material is saturated with hydrogen chloride and said feed material is contacted with from about 10 to 40% by weight of $AlCl_3$ by weight based on said feed for a period of time of from about 1 to 4 hours and at a temperature of from 0 to 70° C.

10. The method as defined by claim 9, wherein said temperature is from about 20 to 30° C.

11. The method as defined by claim 1, wherein said Friedel-Crafts catalyst system comprises $AlCl_3$ in admixture with $SbCl_3$.

12. The method as defined by claim 1, further comprising fractionating the reaction product to separate said product tetramethylcyclohexanes therefrom.

13. A method for selectively converting diethylcyclohexanes to their corresponding gem-structured tetramethylcyclohexanes, comprising contacting under anhydrous conditions a diethylcyclohexane-containing feed having less than 5% aromatic content with from about 1 to 60% by weight based on said feed of a combined Friedel-Crafts catalyst system consisting essentially of $AlCl_3$ and $SbCl_3$ at a temperature of from 0° C. to 150° C. for a period of time of from 0.1 to 10 hours, whereby from about 20 to 50% of the diethylcyclohexanes are selectively converted to the corresponding gem-structured tetramethylcyclohexanes.

References Cited

UNITED STATES PATENTS

| | | | |
|---|---|---|---|
| 2,299,716 | 10/1942 | Peski | 260—666 R |
| 2,324,073 | 7/1943 | Gaylor et al. | 260—666 R |

OTHER REFERENCES

Chem. Absts. 45, 7026, 1951 (G. Chiurdoglu et al.) Bull. Soc. Chim. Bolges 59, 140–5 (1950) and 156–73.

DELBERT E. GANTZ, Primary Examiner

V. O'KEEFE, Assistant Examiner

UNITED STATES PATENT OFFICE
CERTIFICATE OF CORRECTION

Patent No. 3,776,965      Dated December 4, 1973

Inventor(s) Henri Robert Debus et al.

It is certified that error appears in the above-identified patent and that said Letters Patent are hereby corrected as shown below:

In the heading to the printed specification, after line 10 insert -- Claims priority, application France, July 13, 1971, 7125591 --.

Signed and sealed this 3rd day of September 1974.

(SEAL)
Attest:

McCOY M. GIBSON, JR.
Attesting Officer

C. MARSHALL DANN
Commissioner of Patents